United States Patent [19]

Hamane et al.

[11] Patent Number: 4,813,299
[45] Date of Patent: Mar. 21, 1989

[54] AUTOMATIC TRANSMISSION

[75] Inventors: Masumi Hamane, Kawagoe; Hiroshi Ohri, Shiki, both of Japan

[73] Assignee: Honda Giken Kogyo Kabushiki Kaishi, Tokyo, Japan

[21] Appl. No.: 199,564

[22] Filed: Oct. 21, 1980

[30] Foreign Application Priority Data

Oct. 26, 1979 [JP] Japan .................. 54-138531

[51] Int. Cl.[4] ............................................. F16H 3/74
[52] U.S. Cl. .................................... 74/752 E; 192/46; 74/781 R
[58] Field of Search ................. 74/752 E, 751, 781 R; 192/46

[56] References Cited

U.S. PATENT DOCUMENTS

| | | | |
|---|---|---|---|
| 1,315,124 | 9/1919 | Hively et al. | 192/46 |
| 1,412,498 | 4/1922 | Wolverton | 192/46 |
| 1,429,196 | 9/1922 | Dughera | 192/46 |
| 1,767,593 | 6/1930 | Laabs | 192/46 |
| 1,939,152 | 11/1928 | Trout et al. | 192/46 |
| 4,254,852 | 7/1978 | Orozco | 192/46 |
| 4,273,008 | 6/1979 | Ishihara et al. | 74/752 E |
| 4,369,674 | 1/1983 | Hamane et al. | 74/781 R |

FOREIGN PATENT DOCUMENTS

| | | | |
|---|---|---|---|
| 228996 | 7/1960 | Australia | 192/46 |
| 657009 | 7/1928 | France | 192/46 |
| 1332151 | 6/1963 | France | 192/46 |
| 54-61750 | 5/1979 | Japan | |
| 739881 | 11/1955 | United Kingdom | 192/46 |

Primary Examiner—Dirk Wright
Attorney, Agent, or Firm—Roberts, Spiecens & Cohen

[57] ABSTRACT

An automatic transmission comprising a planetary gear mechanism having a first gear driven from a drive shaft, a second gear engagable with the first gear to transmit speed change output to a driven shaft, and a third gear engagable with the second gear to control the operation thereof. A centrifugally operated clutch operates to directly connect the first gear and second gear when the rotational speed of the driven shaft exceeds a predetermined value, and a ratchet type one-way clutch is disposed between the third gear and a fixed construction member to permit rotation of the third gear in the same direction as that of said drive shaft but prevent rotation in the reverse direction. The ratchet type one-way clutch comprises a ratchet pawl supporting plate integrally connected to the third gear, a supporting member having annular ratchet teeth adjacent the supporting plate and fixedly mounted on the fixed construction member, and at least two ratchet pawls rotatably supported on the supporting plate for movement under centrifugal force to engage and disengage the ratchet teeth. The pawls are spaced on the supporting plate so that the pawls are angularly offset with respect to the teeth whereby the pawls can not engage the ratchet teeth concurrently and preferably the pawls are angularly offset with respect to the ratchet teeth by one-half of the pitch of one tooth.

2 Claims, 3 Drawing Sheets

AUTOMATIC TRANSMISSION

FIELD OF THE INVENTION

The present invention relates to improvements in an automatic transmission comprising the combination of a planetary gear mechanism, a centrifugally operated clutch and a one-way clutch.

BACKGROUND

The one-way clutch in the automatic transmission controls rotation of a gear forming a part of the planetary gear mechanism so that the planetary gear mechanism may be automatically varied in speed in response to operation of the centrifugally operated clutch. In general, the one-way clutch comprises a ratchet pawl supporting plate integrally connected to said gear, a ratchet supporting member having annularly disposed ratchet teeth adjacent the ratchet pawl supporting plate and secured to a fixed construction member, and a plurality of ratchet pawls journalled on the ratchet pawl supporting plate for movement to engage and disengage the ratchet teeth. In this regard, the ratchet pawls are brought into engagement with the ratchet teeth when the automatic transmission is in a first operative state, to hold the gear in its locked state, whereas the ratchet pawls are disengaged from the ratchet teeth when the transmission is in a second operative state, to release the gear.

In the prior art construction, the plurality of ratchet pawls are all placed in coincidence with the ratchet teeth in their engaging phase. Therefore, if the ratchet pawls should impinge upon the tips of the ratchet teeth and be repelled therefrom in a repeated manner when the automatic transmission is shifted from the second operative state to the first operative state, power is not transmitted, giving rise to the disadvantage of decreased durability of the ratchet pawls.

SUMMARY OF THE INVENTION

It is an object of the present invention to provide an automatic transmission of the type as described above which is simple in construction, always provides positive engagement of the ratchet pawls with the ratchet teeth and provides precise automatic change-over of the speed changing operation, while overcoming those disadvantages encountered in the conventional automatic transmission noted above.

In accordance with the above and other objects of the invention, it is comtemplated that the ratchet pawls are mounted on a support plate in relatively spaced relation with respect to the ratchet teeth so that pawls can not engage the ratchet teeth concurrently.

In a particular embodiment, the pawls are so spaced on the supporting plate so that they are angularly offset with respect to the ratchet teeth by one-half of the pitch of one tooth.

In another particular arrangement, the pawls are disposed in two sets of respective pairs, the pawls in each pair being diagrammatically opposed on the supporting plate. The sets of pawls are spaced on the supporting plate so that the pawls of the sets are angularly offset with respect to the ratchet teeth by one-half of the pitch of one tooth.

DETAILED DESCRIPTION

An embodiment of the present invention will be described with reference to a drive means in a small motorcycle.

Figure 1:
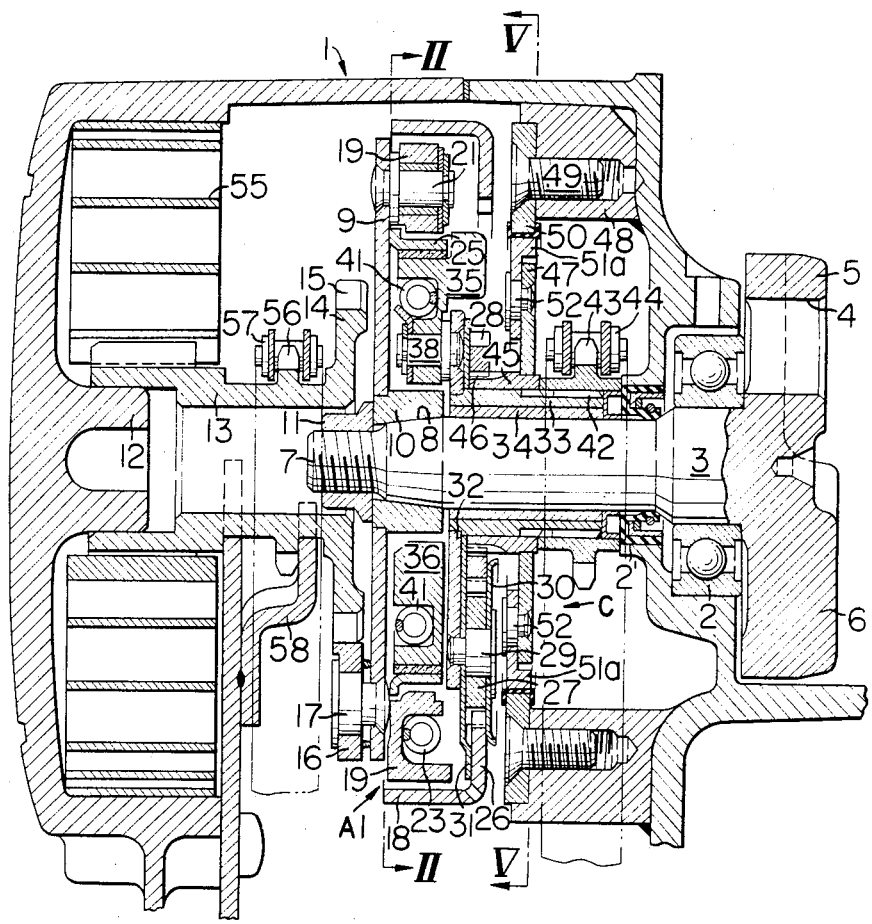
FIG. 1 is a longitudinal sectional view, taken along line I—I in FIG. 2, of an automatic transmission embodying the present invention, applied to a drive means in a small motorcycle.

Referring to FIG. 1, therein is seen a casing 1 having bearings 2 supporting a drive shaft 3. A seal member 2' seals the shaft 3 in casing 1 which contains a lubricating oil therein. A crank arm 5 having a crank pin supporting bore 4, and a counter weight 6 is mounted at the inner end portion of the drive shaft 3, i.e. at that end portion of the drive shaft 3 which is closer to the engine. The drive shaft 3 has threads 7 on the outer end portion thereof and a tapered surface 8 adjacent to the threads 7. A boss member 10 formed integrally with the central portion of a drive power transmission plate 9 is fitted around the tapered surface 8 and tightly secured thereto by a nut 11 engaged on the threads 7.

A ratchet pawl 16 is pivotally supported on a pin 17 on the outer side of the drive power transmission plate 9, i.e. on the side remote from the engine. The ratchet pawl 16 is engageable with ratchet teeth 15 when the engine is started, the ratchet teeth 15 being provided on the outer circumferential surface of a flange 14 formed at one end portion of a hollow engine-starting shaft 13 which is rotatably fitted at the other end portion thereof around a support shaft 12 projecting from the inner surface of a side wall of the casing 1 toward the drive shaft 3.

Figure 2:
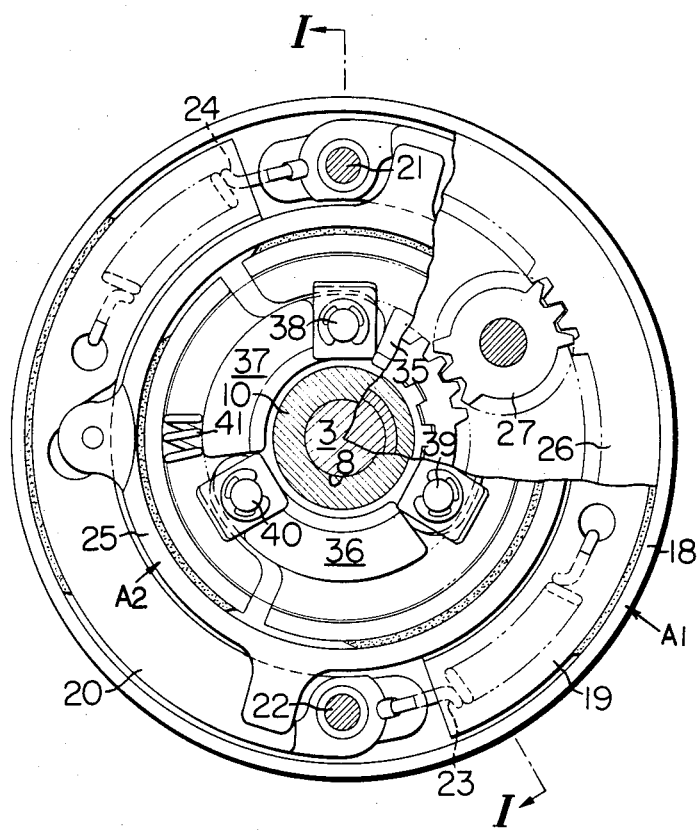
FIG. 2 is a sectional view taken along line II—II in FIG. 1.

Referring to FIGS. 1 and 2, at the inner side of the drive power transmission plate 9, i.e. at the side closer at the engine, an outer annular contactor 18, and a pair of inner arcuate contactors 19, 20 constitute a first centrifugally operated clutch $A_1$. The inner arcuate contactors 19,20 are pivotally supported on pins 21, 22 at respective base end portions which are located at diametrically opposed positions with respect to the outer annular contactor 18. Each of the inner arcuate contactors 19,20 is provided with a lining on the outer circumferential surface thereof for increasing the frictional force between the outer circumferential surface of the inner arcuate contactors 19, 20 and the inner circumferential surface of the outer annular contactor 18. Tension coil springs 23, 24 are provided between the front end portion of the inner arcuate contactor 19 and the bse end portion of the inner arcuate contactor 20, and between the front end portion of the inner arcuate contactor 20 and the base end portion of the inner arcuate contactor 19. Due to the tension coil springs 23, 24, the inner arcuate contactors 19, 20, which are normally not pressed against the outer annular contactor 18, come into frictional contact with the outer annular contactor 18 due to centrifugal force when the rotational speed of the drive shaft 3 exceeds a predetermined value. At that time, the rotational movement of the drive shaft 3 is transmitted to the outer annular contactor 18.

An outer annular contactor 25, which constitutes a part of a second centrifugally operated clutch $A_2$ (to be described more fully later), is secured to a portion of the inner surface of the drive power transmission plate 9 at a location radially inwards of the inner arcuate contactors 19, 20.

Figure 4:
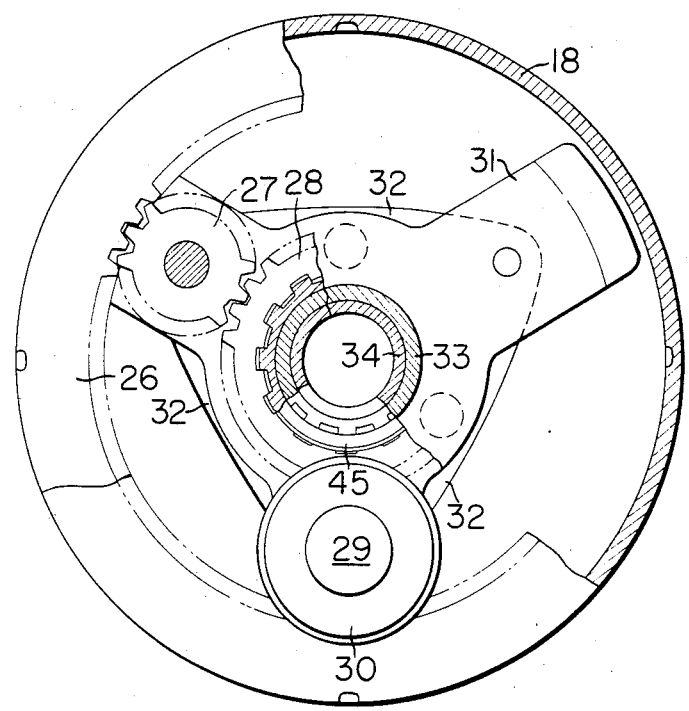
FIG. 4 is a side elevational view partially in section taken along line IV—IV in FIG. 3.
Figure 3:
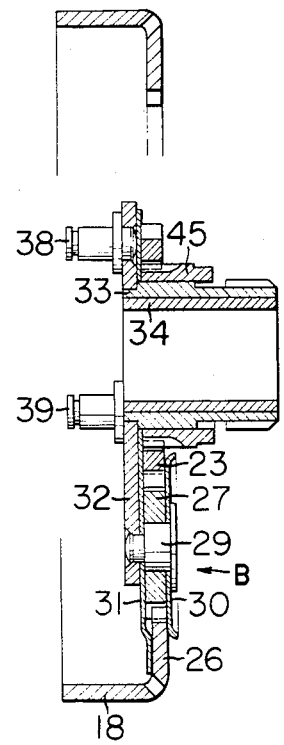
FIG. 3 is a longitudinal sectional view of a principal portion of the embodiment shown in FIG. 1.

Referring to FIGS. 1, 3 and 4, a ring gear 26, which constitutes a part of a planetary gear mechanism B, is formed integrally at its outer peripheral portion with the outer annular contactor 18. The ring gear 26 is engaged with three planetary gears 27, which are engaged with a sun gear 28. Each of the planetary gears 27 carries a pair of side plates 30, 31 on the opposite surfaces thereof. A planetary gear supporting pin 29 supports each of the planetary gears 27 rotatably and in spaced relationship on a planetary gear supporting plate 32. Pin 29 also supports the side plate 30 such that the side plate 30 can be rotated relative to the pin 29. The side plates 30, 31 extend beyond the outer periphery of the planetary gear 27 and up to both side surfaces of the ring gear 26 and sun gear 28, and relatively slidably hold the ring gear 26 and sun gear 28 at both side surfaces thereof such that the side plates 30, 31 cooperate with each other to suppress relative axial movements of the ring gear 26 and sun gear 28 with respect to the planetary gear 27. Each of the side plates 30 is of circular form and is concentric with the associated planetary gear 27. A peripheral portion of the side plate 30 is bent away from the side surface of the gear 27 so that the surface of side plate 30 facing gear 26 will be smooth so that relative sliding contact between the peripheral portion of the side plate 30 and the gear 26 is promoted. The side plate 31 consists of a one-piece plate extended over the three planetary gears 27. The ring gear 26 has an axial width less than that of the planetary gears 27. The peripheral portion of the side plate 31 is bent to elastically contact the side surface of the ring gear 26. As a result, the ring gear 26 is held by the side plates 30, 31 with elasticity.

A planetary gear supporting plate 32 is fixedly mounted on the outer circumferential surface of one end portion of a hollow driven shaft 33 fitted around the drive shaft 3 via a bearing 34. A sprocket 43 is mounted on the circumferential surface of the other end portion of the driven shaft 33 via a spline 42. The sprocket 43 is immersed in the lubricating oil sealed in the casing 1 and is operatively connected to a sprocket on a drive wheel via a drive chain 44.

Referring to FIGS. 1 and 2, the clutch $A_2$ further comprises three inner arcuate contactors 35, 36, 37 pivotally supported by pins 38, 39, 40 on the side surface of the planetary gear supporting plate 32 which is remote from the engine. Linings are provided on the outer circumferential surfaces of the inner arcuate contactors 35, 36, 37 for the purpose of increasing frictional force generated between the outer circumferential surfaces of the inner arcuate contactors 35, 36, 37 and the inner circumferential surface of the outer annular contactor 25. Each of the inner arcuate contactors 35, 36, 37 has a circumferentially extending groove, in which a coil spring 41 common to the contactors 35, 36, 37 is mounted. Due to the coil spring 41, the inner arcuate contactors 35, 36, 37, which are normally not pressed against the outer annular contactor 25, come into frictional contact therewith to provide direct coupling between the gears 27 and 26 by centrifugal force when the speed of orbital motion of the planetary gear 27, i.e. the rotational speed of the driven shaft 33, exceeds a predetermined value thereby to stop the relative rotation of the planetary gear 27 and drive shaft 3. At this time, the planetary gear 27 is not rotated around its own axis; the planetary gear 27 as well as drive shaft 3, inner arcuate contactors 19, 20, outer annular contactor 18, ring gear 26, planetary gear supporting plate 32 and driven shaft 33 are rotated together with the sun gear 28.

In the above-described planetary gear mechanism B, for example, the ring gear 26 constitutes a first gear of the present invention, the planetary gear 27 constitutes a second gear and the sun gear 28 constitutes a third gear. However, other combinations of the gears may be considered; for example, the ring gear 26 constitutes a second or third gear, the planetary gear 27 constitutes a third or first gear, and the sun gear 28 constitutes a first or second gear.

The sun gear 28 is mounted via a spline 46 on the outer circumferential surface of the left end portion of a sleeve 45 which is mounted on the driven shaft 33 such that the sleeve 45 can be rotated relative to the driven shaft 33. A ratchet type one-way clutch C for controlling rotation of the sun gear 28 is interposed between the sleeve 45 and a fixed construction member constituted by a bracket 48 projecting from the inner surface of the casing 1.

The clutch C will be described in detail hereafter.

Figure 5:
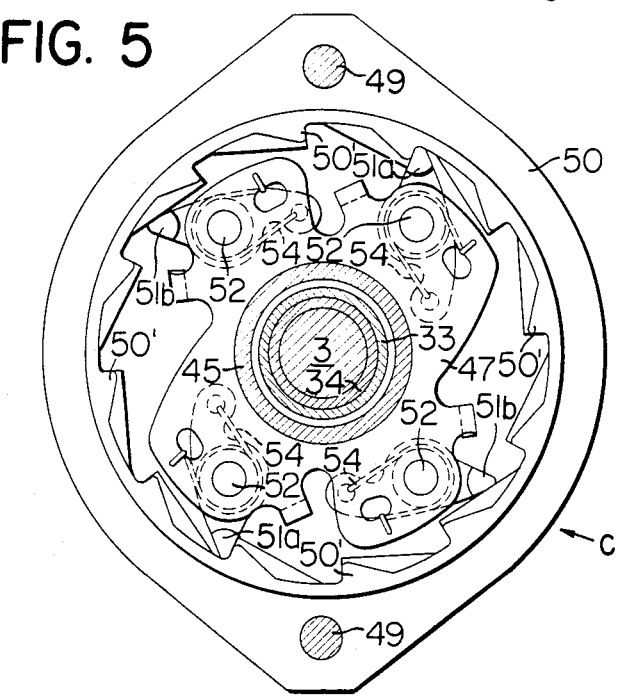
FIG. 5 is a cross-sectional view taken along line V—V in FIG. 1.

Referring to FIGS. 1 and 5, a ratchet pawl supporting plate 47 is fitted on and secured to the outer circumferential surface at the right end of the sleeve 45 and plate 47 is provided with pairs of diametrically opposed ratchet pawls 51a and 51b which are pivotally supported on respective radially outwards projections on plate 47 at one side surface of plate 47 by pins 52.

As seen in FIG. 5, pawls 51a and 51b form respective diametrically opposed sets on opposite sides of a horizontal diameter of the plate 47, the pawls 51a and 51b in each set forming an angle therebetween which is substantially less than 90°. The bracket 48 has an annular supporting member 50 attached thereto by means of bolts 49, and the inner circumferential edge of member 50 is formed with a number of annularly disposed ratchet teeth 50' encircling the ratchet pawl supporting plate 47 such that each of the ratchet pawls 51a and 51b is adapted to be engaged with the ratchet teeth 50'. In this case, in the engaging phase, one pair of ratchet pawls is placed in concidence with the ratchet teeth 50' whereas the other pair of ratchet pawls is displaced from the teeth by an amount preferably equal to one half of the pitch of the ratchet teeth 50'. Thus, as seen in Fig. 5 the pair of ratchet pawls 51a is engaged with the ratchet teeth 50' while the pawls 51b are out of engagement with the teeth.

Each of the ratchet pawls 51a, 51b is constantly biased so as to be engaged with the ratchet teeth 50' by a spring 54 which encircles the respective pin 52.

Each spring has one end engaged in a retaining hole in the respective projection on plate 47 while the other end of the spring is retained in a hole in an end of the pawl remote from the nose which engages the teeth. When the ratchet pawls receive a rotational force exceeding a predetermined value in the same direction in which the drive shaft 3 is rotated, the ratchet pawls are completely disengaged from the ratchet teeth 50' so as to be swung by centrifugal force. In other words, when the inner arcuate contactors 35,36,37 come into frictional contact with the outer annular contactor 25 to allow the ring gear 26, planetary gear 27, sun gear 28 and driven shaft 33 to be rotated together with the drive shaft 3, the ratchet pawls 51a and 51b are swung away from the ratchet teeth 50' to positions where the ratchet pawls are not in contact with the ratchet teeth 50'. Thereby, the ratchet pawls and teeth will not generate any meshing sounds therebetween when the drive shaft 3 is rotated at a high speed and there will be no reduction in speed.

Conversely, when the sun gear 28 comes close to being rotated in a direction opposite to the direction in which the drive shaft 3 is rotated, the ratchet pawls 51a and 51b safely come into engagement with the ratchet teeth 50' so that the rotation in the aforesaid direction of the sun gear 28 can be prevented.

Referring again to FIG. 1, an energy-storing coil spring 55 is fastened at one end to the outer circumferential surface of the outer end portion of the hollow engine-starting shaft 13, and at the other end to the inner surface of the casing 1. An energy-storing transmission chain 57 is connected between a sprocket 56, integrally formed on the outer circumferential surface of the hollow engine-starting shaft 13, and a sprocket (not shown) cooperating with an engine starting pedal (not shown). The hollow engine-starting shaft 13 is supported and reinforced in a pressed manner by a reinforcing presser member 58.

In the above-described construction, the engine starting pedal is stepped on to rotate the hollow engine-starting shaft 13 via the energy storing transmission chain 57 so that energy is stored in the energy-storing coil spring 55. When energy stored in the spring 55 is released all at once, a rotational force is thereby generated, which is transmitted to the engine via the hollow engine-starting shaft 13, ratchet pawl 16, drive power transmission plate 9 and drive shaft 3, to start the engine.

When the engine is started, the rotational force generated thereby is transmitted to the drive shaft 3 and drive power transmission plate 9 so that the ratchet pawl 16 is disengaged from the ratchet teeth 15 by centrifugal force. When the rotational speed of the engine exceeds a predetermined value, the inner arcuate contactors 19, 20 come into frictional contact with the outer annular contactor 18. As a result, the rotation of the drive shaft 3 is transmitted to the drive wheel via the outer annular contactor 18, ring gear 26, planetary gear 27, planetary gear supporting plate 32, driven shaft 33, sprocket 43 and drive chain 44. While the rotation of the drive shaft 3 is thus transmitted to the drive wheel, the ratchet pawls 51a, 51b are engaged with the ratchet teeth 50' so that the sun gear 28 is not rotated. Thus, the rotation of the drive shaft 3 is reduced by rotatio of the planetary gear 27 and transmitted to the driven shaft 33, which is referred to as the first state.

When the rotational speed of the driven shaft 33 is further increased to reach high speed, the inner arcuate contactors 35 36, 37 comes into frictional contact with the outer annular contactor 25 so that the ring gear 26, planetary gear 27 and sun gear 28 are rotated with the drive shaft 3 in the same direction. As a result, the ratchet pawls 51a, 51b are disengaged from the ratchet teeth 50'. Consequently, the driven shaft 33 and sprocket 43 are rotated at the same speed as the drive shaft 3, and thus, the speed ratio is 1:1, which is referred to as the second state.

Next, in the event that the speed of rotation of the driven shaft 33 is reduced to a low speed due to an increase in load applied to the drive wheels so that the automatic transmission is returned from the second state to the first state, each of the ratchet pawls 51a, 51b is swung to be engaged with the ratchet teeth 50' under the bias of the springs 54. In this case, even if one pair of ratchet pawls 51a (or 51b) should impinge upon the tips of the ratchet teeth 50' to receive repulsion forces, the other pair of ratchet pawls 51b (or 51a) displaced in engaging phase therefrom would assume a position on the inclined surface of the other ratchet teeth 50'. Thereby, the ratchet pawls can positively engage the ratchet teeth 50' by slight rotation of the ratchet pawl supporting plate 47 by an amount less than one pitch of the ratchet teeth 50'. As a consequence, rotation of the ratchet pawl supporting plate 47 and sun gear 28 may be prevented so that the transmission rapidly assumes the first state.

As described above, in accordance with the present invention, at least two ratchet pawls displaced in engaging phase with the ratchet teeth are pivotally supported on the ratchet pawl supporting plate associated with the third gear of the planetary gear mechanism. With this arrangement, when the automatic transmission is switched from the second state to the first state, either ratchet pawl can always engage the ratchet teeth positively without repulsion, whereby the transmission may be shifted to the first state without fail, thus involving no loss of power and minimizing engaging shock of the ratchet pawls thereby increasing the durability thereof.

What is claimed is:

1. An automatic transmission connected between a drive shaft and a driven shaft and comprising: a planetary gear mechanism including a first gear driven by the drive shaft, a second gear operatively engaged with said first gear to transmit speed change output to the driven shaft, and a third gear operatively engaged with said second gear to control the operation thereof; centrifugally operated clutch means for driving said first gear and said second gear therewith when the rotational speed of the drive shaft exceeds a predetermined value; and a ratchet type one-way clutch means for permitting rotation of said third gear in the same direction as that of the drive shaft but preventing rotation in the reverse direction; said ratchet type one-way clutch means comprising a ratchet pawl supporting plate coaxially disposed relative to said drive shaft and integrally connected to said third gear, said ratchet pawl supporting plate including outwardly projecting radial projections united with one another at base portions thereof, a fixed supporting member having annular ratchet teeth adjacent said ratchet pawl supporting plate, at least two pairs of ratchet pawls each provided on a respective one of said radial projections on the supporting plate, pivot means rotatably supporting each ratchet pawl on a side surface of the corresponding said radial projection for engaging and disengaging movement relative to said ratchet teeth, and spring means biasing each ratchet pawl for meshing with said ratchet teeth in engaged position, said pivot means mounting each ratchet pawl such that rotation of said supporting plate will produce pivotal movement of said ratchet pawl by centrifugal force in a direction to produce disengagement from said ratchet teeth against the biasing force of said spring means when the speed of rotation of said third gear exceeds a predetermined value, said pawls being arranged in two diametrically opposed sets of respective pairs of pawls, the pawls in the opposed sets being located on opposite sides of a common diameter of said supporting plate, the pawls in each pair being disposed in a diametrically opposed relation and being engageable with said ratchet teeth simultaneously, adjacent pawls in each set forming an angle therebetween of less than 90° and being offset from one another relative to said ratchet teeth such that the pawls in each set can not engage the ratchet teeth concurrently.

2. An automatic transmission as claimed in claim 1 wherein each ratchet pawl has an end for engaging the ratchet teeth and a remote end, said spring means of each pawl encircling the respective pivot means therefor, said spring means having one end retained in a retainer hole provided in the corresponding radial projection and a second end retained in a second retainer hole provided in said remote end of the respective ratchet pawl.

* * * * *